(No Model.) 2 Sheets—Sheet 1.
E. C. HOLLADAY.
CULTIVATOR FENDER.
No. 432,047. Patented July 15, 1890.
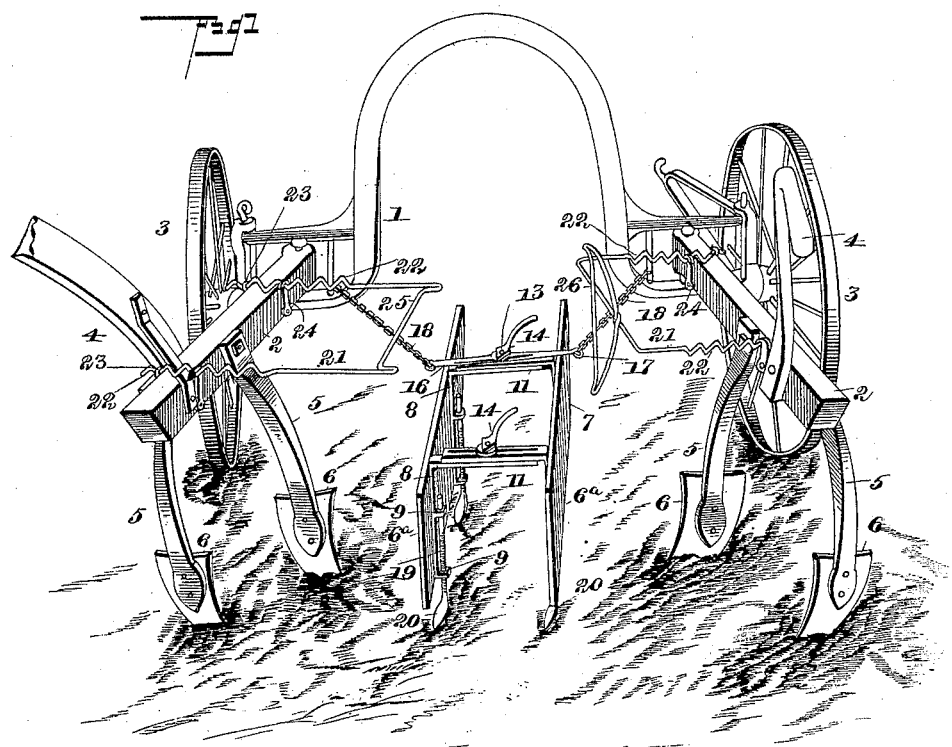
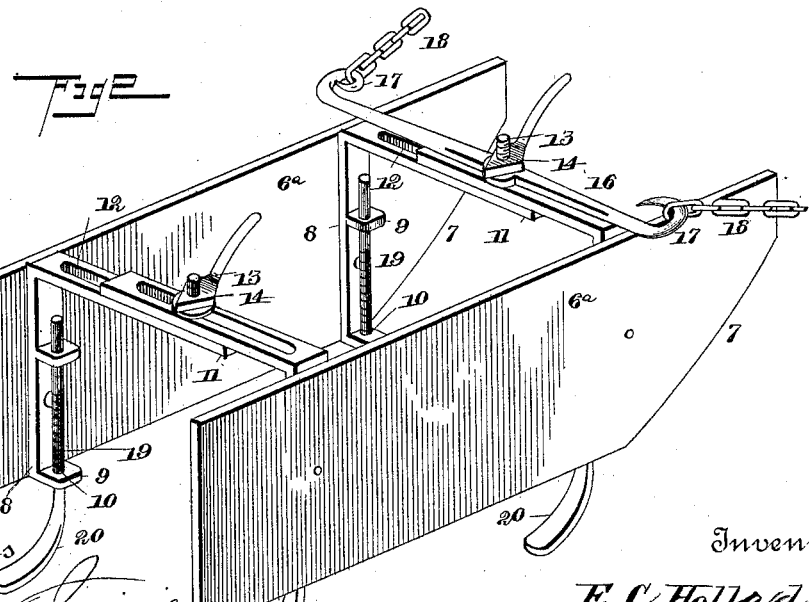
Witnesses
John Imirie
Wm. Bagger
Inventor
E. C. Holladay
By his Attorneys
C. A. Snow & Co.

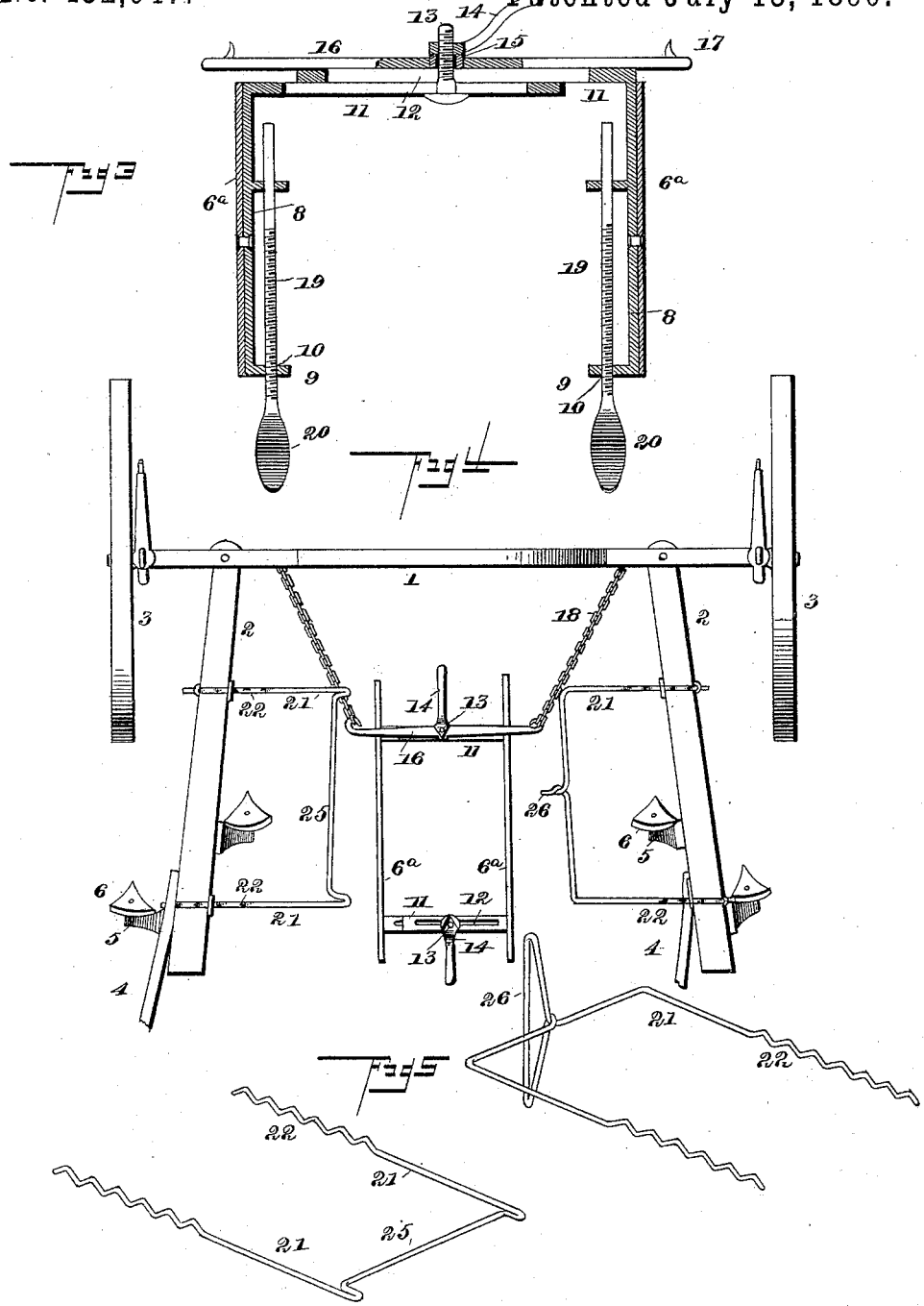

UNITED STATES PATENT OFFICE.

EDGAR C. HOLLADAY, OF NEW MARKET, IOWA.

CULTIVATOR-FENDER.

SPECIFICATION forming part of Letters Patent No. 432,047, dated July 15, 1890.

Application filed March 26, 1890. Serial No. 345,452. (No model.)

*To all whom it may concern:*

Be it known that I, EDGAR C. HOLLADAY, a citizen of the United States, residing at New Market, in the county of Taylor and State of Iowa, have invented a new and useful Cultivator-Fender, of which the following is a specification.

This invention relates to shields or fenders for cultivators; and it has for its object to provide a device of this class which shall be capable of being applied for operation to cultivators of ordinary construction, and in such a manner as to adapt it especially for the cultivation of listed corn, and in such a manner as to permit the beams of the cultivator to be manipulated independently of each other without danger of the shovels of either beam running into the row of growing plants.

The invention consists in the improved construction, arrangement, and combination of details, which will be hereinafter fully described, and particularly pointed out in the claims.

In the drawings hereto annexed, Figure 1 is a rear perspective view of a cultivator equipped with my improved shield or fender. Fig. 2 is a perspective detail view of the shield or fender detached from the cultivator. Fig. 3 is a transverse vertical sectional view of the shield or fender. Fig. 4 is a plan view of the device complete, as shown in Fig. 1. Fig. 5 is a perspective detail view of the buffers used in connection with my invention.

Like numerals of reference indicate like parts in all the figures of the drawings.

1 designates the arched axle, and 2 2 the beams, of a cultivator of ordinary construction, the front ends of said beams being connected with the axle by means of vertical bolts, which enable the said beams to swing laterally in the usual manner. The axle is provided with supporting-wheels 3, and the beams are equipped with handles 4, by means of which they may be guided when the machine progresses over the ground. Each of the beams may be provided with one or more standards 5, having shovels 6 of ordinary construction.

My improved fender is composed of two separate shields or plates $6^a$ $6^a$, of suitable dimensions, and the front ends of which are preferably cut off obliquely on their under sides, as shown at 7. To the inner sides of the shields or plates $6^a$ are secured the vertical braces 8, which are provided at suitable points with inwardly-extending lugs or ears 9, having vertical screw-threaded perforations 10. The upper ends of the braces 8 are provided with inwardly-extending arms or brackets 11, having slots 12 to receive the vertical connecting-bolts 13, the upper ends of which are provided with adjusting-nuts 14, by tightening which the arms or brackets 11 of the two shields 6 may be clamped together, so as to secure the said shields at any desired adjustment with relation to each other. It will be seen that by loosening the nut 14 the vertical shields or plates $6^a$ may be readily adjusted to a greater or smaller distance apart, at which they may be firmly secured by simply retightening the nuts.

Upon the bolt 13, which connects the arms 11 at the front ends of the shields or fenders, and below the nut 14 upon the said bolt, is mounted a washer or sleeve 15, which is circular in shape, and upon which is journaled a transverse arm 16, the ends of which are provided with hooks 17, which may be connected by means of straps, chains, or other suitable means, as shown at 18, with the cultivator-beams 2, near the front ends of the latter. In this manner the fender will be dragged along between the cultivator-beams when the machine progresses over the ground, and freedom of motion is attained by the arm 16 being journaled loosely upon the sleeve or washer 15, while at the same time the latter serves to so compress the arms or brackets 11 as to hold them securely with relation to each other when the nut 14 is tightened.

In the screw-threaded perforation 10 in the lugs 9, extending inwardly from the vertical braces 8 of the shields or fenders, are adjusted the vertical screw-threaded shanks 19, the lower ends of which are bent rearwardly to form flat feet 20, that serve as runners to ride easily over the ground and support the shield or fender. The elevation at which the latter shall be supported above the ground may be regulated by adjusting the screw-threaded shanks 19 so as to adjust the lower edges of the shields or fenders $6^a$ at any desired distance above the surface of the soil.

To the cultivator-beams are secured devices which I term "buffers," and which are composed of frames of metallic rods twisted so as to form arms 21, adapted to rest horizontally and transversely upon the upper sides of the cultivator-beams. The arms 21 of both of said frames are crimped or corrugated, as will be seen at 22, and the said cultivator-beams are provided at their outer sides with staples 23 and at their inner sides with hooks 24, said staples being adapted to receive the crimped ends of the arms, and the hooks 24 being adapted to secure the said arms at any desired adjustment. The inner end of one of the frames is provided with a horizontal cross-bar 25, and the inner end of the other frame is provided with a vertical cross-bar 26, said cross-bars serving when in contact with each other to prevent the cultivator-beams from approaching each other any farther. It will be seen that by loosening the hooks 24 the buffer-frames may be readily adjusted to any desired position, at which they may be secured by again fastening the said hooks. When in operation, the cultivator-beams approach each other. Owing to any sudden inequalities in the soil the said buffer-frames, by coming in contact with each other, will prevent the said cultivator-beams from being thrown violently together, and thereby causing the cultivator-shovels to injure the rows of growing plants.

From the foregoing description, taken in connection with the drawings hereto annexed, the operation and advantages of my invention will be readily understood. The shield or fender, it will be seen, is kept normally at a position between the cultivator-beams, and will be dragged forwardly smoothly and evenly without regard to any lateral movement of the cultivator-beams. The shields or plates composing the fender may be conveniently adjusted at any desired distance apart, according to the width of the row, and the individual shields may also be conveniently raised to and supported at any desired distance above the soil, thereby permitting any desired quantity of the dirt which is being loosened by the cultivator-shovels to be thrown over the roots of the growing plants without the slightest danger of covering and checking the growth of the young plants. My invention, for this reason, is especially adapted to the cultivation of listed corn; but it is obvious that it may with equal efficiency be used for the cultivation of checked or planted corn or other crops that are planted in rows. Apart from the fact that the shields or fenders may be adjusted and held securely at any desired relation with regard to the row of plants, it will be noted that there is absolutely no danger of the cultivator-shovels interfering injuriously with the growing plants, inasmuch as the buffer-frames, which are adjustable, as hereinbefore described, will absolutely prevent the said cultivator-beams from being jolted beyond the control of the operator, thereby causing the cultivator-shovels to injure the crop. The parts of the invention are simple and inexpensive, and may be readily applied to cultivators of ordinary construction, whether constructed with or without tongues.

With regard to the details of the construction of the buffer-frames, as well as the means for adjusting the shields or fenders vertically and laterally, I would have it understood that I do not limit myself to the precise details herein described, but reserve the right to any modifications which may be resorted to without departing from the spirit of my invention.

Having thus described my invention, what I claim is—

1. In a fender for cultivators, the combination of a pair of shields or plates having suitable vertically-adjustable feet or supports, with means for adjusting the said shields laterally with relation to each other, substantially as set forth.

2. In a fender for cultivators, the combination of a pair of shields, the vertically-adjustable shanks upon the inner sides of said shields, and feet or supports at the lower ends of said shanks, substantially as set forth.

3. In a fender for cultivators, the combination of a pair of shields, vertical braces upon the inner sides of said shields having laterally-extending lugs provided with screw-threaded perforations, and screw-threaded stems or shanks extending through the latter and having feet or supports at their lower ends, substantially as set forth.

4. In a fender for cultivators, the combination of a pair of shields or plates having inwardly-extending slotted arms or brackets, means for connecting the latter adjustably, and vertically-adjustable supporting stems or shanks having feet at their lower ends, substantially as set forth.

5. In a fender for cultivators, the combination of a pair of shields or plates, the vertically-adjustable supporting stems or shanks having rearwardly-bent feet or supports, and means for adjusting the said plates or shields laterally with relation to each other, substantially as set forth.

6. In a fender for cultivators, the combination, with a pair of suitably-connected shields or plates having vertically-adjustable supporting-stems, of a swiveled arm provided at its ends with hooks adapted to be connected with the cultivator-beams by straps, chains, or equivalent devices, substantially as and for the purpose set forth.

7. In a fender for cultivators, the combination of a pair of vertical plates, vertical straps or braces upon the inner sides of said plates provided at their upper ends with inwardly-extending slotted arms and having inwardly-extending vertically-perforated screw-threaded lugs, the vertical connecting-bolts, the vertically-adjustable supporting-stems provided at their lower ends with rearwardly-bent feet or supports, and a swiveled arm mounted upon one of the connecting-bolts and having hooks adapted to be connected with the cultivator-beams by means of straps or chains, substantially as set forth.

8. In a cultivator-fender, the combination of a pair of suitably-connected shields or plates, vertically-adjustable supports for the same, the vertical connecting-bolts, a sleeve or washer mounted upon one of said connecting-bolts, and an arm swiveled or journaled upon said sleeve or washer and provided at its ends with hooks adapted to be connected with the cultivator-beams by means of straps, chains, or equivalent devices, substantially as and for the purpose set forth.

9. The combination, with a cultivator, of buffer-frames secured adjustably to the beams of the same and adapted to come into contact with each other by the lateral movement of said beams, substantially as set forth.

10. The combination, with a cultivator, of the buffer-frames having crimped or corrugated arms, and the staples and hooks adapted to engage said arms and to connect the said frames adjustably to the beams of the cultivator, substantially as set forth.

11. The combination, with a cultivator, of the buffer-frames secured laterally adjustably to the beams thereof, said frames being provided at their inner ends, respectively, with horizontal and vertical bars adapted to engage each other, substantially as set forth.

12. The combination, with a cultivator, of a fender composed of laterally-adjustable suitably-connected shields mounted upon vertically-adjustable stems or supports, a swiveled arm connected to said fender, straps, chains, or equivalent devices connecting the ends of said swiveled arm with the cultivator-beams, and the buffer-frames secured adjustably to the latter and extending inwardly from the same, substantially as and for the purpose herein set forth.

In testimony that I claim the foregoing as my own I have hereto affixed my signature in presence of two witnesses.

E. C. HOLLADAY.

Witnesses:
   S. G. KELSO,
   W. P. PETERMAN.